United States Patent
Davis et al.

(10) Patent No.: US 8,114,319 B2
(45) Date of Patent: Feb. 14, 2012

(54) DEVICE AND METHOD FOR PRODUCING SPHERICAL SEGMENTED FLOW

(75) Inventors: Robert Huw Davis, Hengoed (GB); Daniel David Palmer, Cardiff (GB)

(73) Assignee: Q Chip Limited, Cardiff, Wales (GB)

( * ) Notice: Subject to any disclaimer, the term of this patent is extended or adjusted under 35 U.S.C. 154(b) by 860 days.

(21) Appl. No.: 11/883,611

(22) PCT Filed: Dec. 19, 2005

(86) PCT No.: PCT/GB2005/004947
§ 371 (c)(1),
(2), (4) Date: Jul. 15, 2008

(87) PCT Pub. No.: WO2006/082351
PCT Pub. Date: Aug. 10, 2006

(65) Prior Publication Data
US 2008/0314464 A1    Dec. 25, 2008

(30) Foreign Application Priority Data

Feb. 4, 2005   (GB) .................................. 0502398.1

(51) Int. Cl.
*B29B 9/00*   (2006.01)
(52) U.S. Cl. .................. 264/11; 264/5; 425/6; 422/129; 422/131
(58) Field of Classification Search ........................ None
See application file for complete search history.

(56) References Cited

U.S. PATENT DOCUMENTS 7,718,099 B2 * 5/2010 Kawai et al. .................... 264/11

2003/0015194 A1   1/2003 Schiewe et al.
2005/0032240 A1   2/2005 Lee et al.

FOREIGN PATENT DOCUMENTS

| EP | 1 358 931 A | 11/2003 |
| EP | 1 362 634 A | 11/2003 |
| JP | 2004-122107 A | 4/2004 |
| WO | WO 2004/002627 | * 1/2004 |
| WO | WO 2004/038363 A | 5/2004 |
| WO | WO 2004/043598 A | 5/2004 |
| WO | WO 2004/091763 A | 10/2004 |
| WO | WO 2005/103106 A | 11/2005 |
| WO | WO 2005/123241 A | 12/2005 |

* cited by examiner

*Primary Examiner* — Mary F Theisen
(74) *Attorney, Agent, or Firm* — Frommer Lawrence & Haug LLP; Ronald R. Santucci

(57) ABSTRACT

The invention provides a device (1, 301, 501) for producing a spherical segmented flow of fluid, which device includes: a functional fluid conduit (6, 506) arranged to contain a functional fluid (15, 515); at least two carrier fluid conduits (7, 8, 507, 508), each carrier fluid conduit arranged to carry a carrier fluid (16, 514), the functional fluid conduit merging with the carrier fluid conduits at a junction (9) to form an encased flow conduit (9a, 529) thereby permitting functional fluid to be sandwiched (or encased) by the carrier fluid to form an encased flow, the encased flow conduit having a discontinuity (10, 510) therein such that the encased flow forms into a flow of alternate segmented spheres after the discontinuity, wherein the device is provided with a segmented flow conduit (11, 511) downstream of the encased flow conduit, the encased segmented flow conduit being provided with an enlargement (21, 512) in cross-section.

18 Claims, 3 Drawing Sheets

DEVICE AND METHOD FOR PRODUCING SPHERICAL SEGMENTED FLOW

This application is a 371 of PCT/GB2005/004947 filed on Dec. 19, 2005, published on Aug. 10, 2006 under publication number WO 2006/082351 A1 which claims priority benefits from Great Britain Patent Application Number 0502398.1 filed Feb. 4, 2005, the disclosure of which is hereby incorporated by reference.

The present Invention relates to a method and device for producing a segmented flow of fluid.

A disadvantage of prior art devices for manufacture of segmented flow is that (typically) the fluid content of each segment is mixed earlier than is required by the user. Premature mixing may be disadvantageous to the reaction process.

It is therefore an aim of the present invention to alleviate at least some of the disadvantages identified above.

It is a further aim of the present invention to provide a method and device for producing segmented flow of a fluid.

Therefore, according to a first aspect of the present invention, there is provided a device for producing a spherical segmented flow of fluid, which device includes: a functional fluid conduit arranged to contain a functional fluid;

at least two carrier fluid conduits, each carrier fluid conduit arranged to carry a carrier fluid, the functional fluid conduit merging with the carrier fluid conduits at a junction to form an encased flow conduit thereby permitting functional fluid to be sandwiched (or encased) by the carrier fluid to form an encased flow, the encased flow conduit having a discontinuity therein such that the encased flow forms into a flow of alternate segmented spheres after the discontinuity.

The discontinuity may be in the form of a constriction.

The term 'fluid' as used in the present application is intended to cover liquids, gasses and supercritical fluids, the use of such a term being obvious to a person skilled in the art.

It is particularly preferred that the fluid contained within each carrier fluid conduit is the same. Typically, the fluid contained in the carrier fluid conduit is immiscible with the fluid contained in the functional fluid conduit.

The encased flow conduit typically leads to a segmented flow conduit (i.e. the segmented flow conduit, when present, is downstream of the encased flow conduit). The segmented flow conduit may be located substantially immediately after the discontinuity. The encased flow conduit and the segmented flow conduit may be a unitary conduit.

The segmented flow conduit may be provided with an enlargement in cross-section. The enlargement in cross-section may be substantially at or downstream of the discontinuity. The enlargement may be substantially immediately downstream of the discontinuity, or it may be sufficiently close to the discontinuity so as to encourage the formation of spherical segments. If the enlargement is too far downstream of the discontinuity the enlargement has little or no beneficial effects on the formation of spherical segments.

The applicant believes that the enlargement in cross-section a short distance downstream of the discontinuity (e.g. constriction) assists in the formation of spherical segments by decreasing the velocity of flow a short distance downstream of the constriction. The applicant believes that this causes an increased pressure region substantially at or immediately downstream of the enlargement. This appears to encourage the formation of spherical segments and also improves the uniformity of size of those segments. Although the applicant believes that this is how the device operates, the applicant will not be bound by such understanding if the understanding subsequently proves to be incorrect.

In the absence of the enlargement in cross-section a short distance downstream of the discontinuity there is less uniformity of size of the segments. Furthermore, the presence of such an enlargement leads to an increased range of flow conditions that will lead to the formation of spheres i.e. the enlargement increases the size of the operating "envelope" of the device.

If the depth of the segmented flow conduit immediately downstream of the enlargement is "2 a", then the enlargement may be provided a distance of up to 5 a (and preferably from 0.5 a to 3 a, more preferably 0.5 a to 1.5 a, and most preferably about 1 a) downstream of the discontinuity.

If the cross-sectional area of the segmented flow conduit immediately downstream of the enlargement is "4 $a^2$", then the enlargement may be provided a distance of up to 5 a (and preferably from 0.5 a to 3 a, more preferably 0.5 a to 1.5 a and most preferably about 1 a) downstream of the discontinuity.

If the width of the segmented flow conduit immediately downstream of the enlargement is "2 a", then the enlargement may be provided a distance of up to 5 a (and preferably from 0.5 a to 3 a, more preferably 0.5 a to 1.5 a and most preferably about 1 a) downstream of the discontinuity.

In one example, the segmented flow conduit immediately downstream of the enlargement is substantially square in cross-section, having a width and depth of "2 a". In this case, it is preferred that then the enlargement may be provided a distance of up to 5 a (and preferably from 0.5 a to 3 a, more preferably 0.5 a to 1.5 a and most preferably about 1 a) downstream of the discontinuity.

The cross-sectional area of the segmented flow conduit immediately downstream of the enlargement may be from 1.5 to 10, preferably from 2 to 5 and more preferably from 3.5 to 4.5, times larger than the cross-sectional area of the encased flow conduit or segmented flow conduit immediately upstream of the enlargement.

Such an enlargement often produces a step in the segmented flow conduit which may be beneficial in the formation of spherical segments. A step may be provided in the absence of an enlargement in cross-section. Hence, one of the encased flow conduit and the segmented flow conduit (preferably the segmented flow conduit) may be provided with a step. The step may be substantially at or downstream of the discontinuity. The step may be immediately downstream of the discontinuity or it may be sufficiently close to the discontinuity so as to encourage the formation of spherical segments.

If the depth of the encased flow conduit or segmented flow conduit immediately downstream of the step is "2 a", then the step may be provided a distance of up to 5 a (and preferably from 0.5 a to 3 a, more preferably 0.5 a to 1.5 a and most preferably about 1 a) downstream of the discontinuity.

If the cross-sectional area of the encased flow conduit or segmented flow conduit immediately downstream of the step is "4 $a^2$", then the step may be provided a distance of up to 5 a (and preferably from 0.5 a to 3 a, more preferably 0.5 a to 1.5 a and most preferably about 1 a) downstream of the discontinuity.

If the width of the encased flow conduit or segmented flow conduit immediately downstream of the step is "2 a", then the step may be provided a distance of up to 5 a (and preferably from 0.5 a to 3 a, more preferably 0.5 a to 1.5 a and most preferably about 1 a) downstream of the discontinuity.

It is envisaged that two or more feeder conduits merge to form the functional fluid conduit. Each feeder conduit is typically arranged to contain a different fluid. It is particularly preferred that the fluids contained in each feeder conduit are miscible.

It is self evident to a person skilled in the art, that the number of feeder conduits feeding to the functional flow conduit is dependent on the number of fluids that it is desired to combine in each segment.

Advantageously, the functional fluid conduit is shaped and dimensioned to permit mixing of fluid contained therein. This is particularly advantageous when two or more feeder conduits merge to form the functional fluid conduit. It is envisaged that the fluids in the functional fluid conduit are permitted to undergo physical and/or chemical changes prior to the junction with the carrier fluid conduit.

The functional fluid conduit may be shaped or dimensioned (such as by curves, bends or indentation) so as to assist in mixing.

According to a second aspect of the present invention, there is provided a device for producing a spherical segmented flow of fluid, which device includes: an outer conduit arranged to carry a carrier fluid, the outer conduit having a discontinuity therein; an inner conduit arranged to carry a functional fluid, the outer conduit having an open end prior to the discontinuity in the outer conduit, such that a flow of functional fluid is permitted to flow in the outer conduit whilst being encased by the flow of carrier fluid prior to the discontinuity.

the inner conduit being arranged inside the outer conduit.

It is particularly preferred that fluid contained within the inner conduit and fluid contained within the outer conduit are immiscible.

Advantageously, the encased flow forms into a flow of alternate spherical segments of functional fluid and carrier fluid in the outer conduit after the encased flow passes the discontinuity.

The outer conduit may be provided with an enlargement in cross-section. The enlargement in cross-section may be substantially at or downstream of the discontinuity. The enlargement may be immediately downstream of the discontinuity or it may be sufficiently close to the discontinuity so as to encourage the formation of spherical segments.

If the depth of the outer conduit immediately downstream of the enlargement is "2 a", then the enlargement may be provided a distance of up to 5 a (and preferably from 0.5 a to 3 a, more preferably 0.5 a to 1.5 a and most preferably about 1 a) downstream of the discontinuity.

If the cross-sectional area of the outer conduit immediately downstream of the enlargement is "4 $a^2$", then the enlargement may be provided a distance of up to 5 a (and preferably from 0.5 a to 3 a, more preferably 0.5 a to 1.5 a and most preferably about 1 a) downstream of the discontinuity.

If the width of the outer conduit immediately downstream of the enlargement is "2 a", then the enlargement may be provided a distance of up to 5 a (and preferably from 0.5 a to 3 a, more preferably 0.5 a to 1.5 a and most preferably about 1 a) downstream of the discontinuity.

With respect to devices of the first or second aspects of the present invention, typically, the discontinuity includes a region of changed surface energy, or a region of altered or alterable contact angle. The discontinuity may preferably include the internal configuration of the outer conduit or of the encased flow conduit.

It is a particular advantage of the present invention that the device permits the carrier fluid to meet the functional fluid from both sides. As a result a vena contracta effect of the fluid flow as it passes through the discontinuity occurs, thereby creating spherical segmental flow of the functional fluid. Advantageously, the functional fluid may not come into contact with the internal surface of the encased flow conduit or the outer conduit; this is particularly advantageous as the functional fluid may be a fluid that would react with, or be affected physically by the internal surface of the flow conduit (for example, by virtue of frictional forces between a fluid and the internal surface of a conduit).

The constriction or other discontinuity is preferably substantially at, or close to, the juncture where the functional fluid conduit merges with the carrier fluid conduits.

Preferably, a portion of the segmented flow conduit is shaped and dimensioned to provide a reaction zone or irradiation zone, typically downstream from the discontinuity. The reaction zone or irradiation zone permits reagents in the segments to react with one another, for example, on exposure to UV radiation, causing hardening of the segment. The reaction zone or irradiation zone preferably permits a reaction to be completed before the segments pass through a device exit.

Typically, the segmented flow conduit may have an internal-reflection coating. Advantageously, the internal-reflection coating enhances the "increased-exposure" effect.

Preferably, the device may further include an external radiation source for delivering radiation to the irradiation zone. The external radiation source may be a light source which further preferably is arranged to be delivered via a light guide, which may be adapted to produce a collimated light beam.

It is particularly preferred that, with the exception of the irradiation zone, the device is masked with a reflective shield (which may or may not be an integral part of the device). Advantageously, the reflective shield prohibits, or at least substantially reduces, the uncontrolled local absorption of radiation in the functional fluid conduit, the carrier fluid conduit and/or the encased flow conduit.

The device may be a unitary device, or alternatively may be manufactured from a plurality of separate conduits which are fused or joined together.

The device offers a number of advantages over conventional devices for photochemical reactions, one such advantage includes decreased reaction times. This is due to the high surface/volume ratio of the fluid circuit in the device. In addition, as only nano or pico liter volumes are exposed to a radiation source at any one time, there is significantly less attenuation of incident light by solvent, making the reaction more efficient per photon. Furthermore, efficient mixing can be achieved without the need for external agitation, producing homogenised reaction mixtures, which can be exposed to a tuned radiation source for a controlled time.

In accordance with a third aspect of the present invention, there is provided a microfluidic device, having a functional conduit for carrying a functional fluid, first and second lateral carrier fluid conduits confluent with the functional conduit at a junction region, for carrying a carrier fluid, wherein the device is provided with a further conduit extending from the junction region, the device being provided with a constriction or another discontinuity for producing a flow of spherical segments of functional fluid dispersed in the carrier fluid, the constriction or other discontinuity being located substantially at or downstream of the junction.

The term "microfluidic" is generally well-understood by those skilled in the art. The conduits in such microfluidic devices typically have widths of less than 2 mm, preferably less than 1 mm and more preferably from 0.1 to 0.5 mm. The depths of the conduits are typically less than 2 mm, preferably less than 1 mm and more preferably from 0.1 mm to 0.5 mm. The flow rates of the fluids will depend, inter alia, on the cross-sectional area of the conduits, and the preferred values given here relate to conduits having depths less than 1 mm and widths less than 1 mm. The flow rate, for example, of the functional fluid through the functional fluid conduit may advantageously be from about 0.02 to 5 ml/hour, more preferably be from about 0.1 to 2 ml/hour. The flow rate of the carrier fluid may be from about 0.2 to 15 ml/hour, preferably from about 1 to 3 ml/hour.

The device of the third aspect of the present invention may incorporate those features described above with reference to the first and second aspects of the present invention. For example, the further conduit may be provided with an enlargement in cross-section substantially at or downstream of the constriction or other discontinuity. The enlargement may be substantially immediately downstream of the constriction or other discontinuity or it may be sufficiently close to the constriction or other discontinuity so as to encourage formation of spherical segments. The further conduit may be equivalent to the segmented flow conduit of the device of the first aspect of the present invention.

According to a fourth aspect of the present invention, there is provided a method of producing a spherical segmented flow of a fluid, which method includes: introducing a functional fluid into a functional fluid conduit and a carrier fluid into a carrier fluid conduit; permitting the carrier fluid to contact the functional fluid such that the carrier fluid encases or sandwiches the functional fluid;

providing a discontinuity in the flow of the sandwiched or encased flow such that as the encased flow passes the discontinuity, a vena contracta effect is achieved thereby forcing the encased flow to form into spherical segments.

The method further comprises providing an enlargement in cross-section in a conduit substantially at or immediately downstream of the discontinuity, or sufficiently close to the discontinuity so as to encourage the formation of spherical segments.

The method is preferably carried out in a device substantially as described hereinbefore.

The functional fluid may be a mixture of one or more fluids which are typically miscible.

The present invention may be utilised in a number of chemical reactions to which a micro-photochemical reactor might be applicable. A non-exhaustive list may include: the Paterno-Buchi reaction for the synthesis of oxetanes, Woodward-Hoffman, thermally disallowed, cyclo-addition reactions, synthesis of pinacols, olefin epimerisation reactions, UV polymerisations, photo-oxidations, photolysis or organometallics to provide reactive intermediates for synthesis and deprotection reactions.

Certain embodiments of the present invention will now be described, by way of example only with reference to the Figures, wherein FIG. 1 represents a device according to the first and third aspects of the present invention in use;

FIG. 3b represents a more detailed view of the junction region of the device of FIG. 3a;

FIG. 5b represents a cross-sectional view of the junction region of the device of FIG. 5a.

Figure 1:
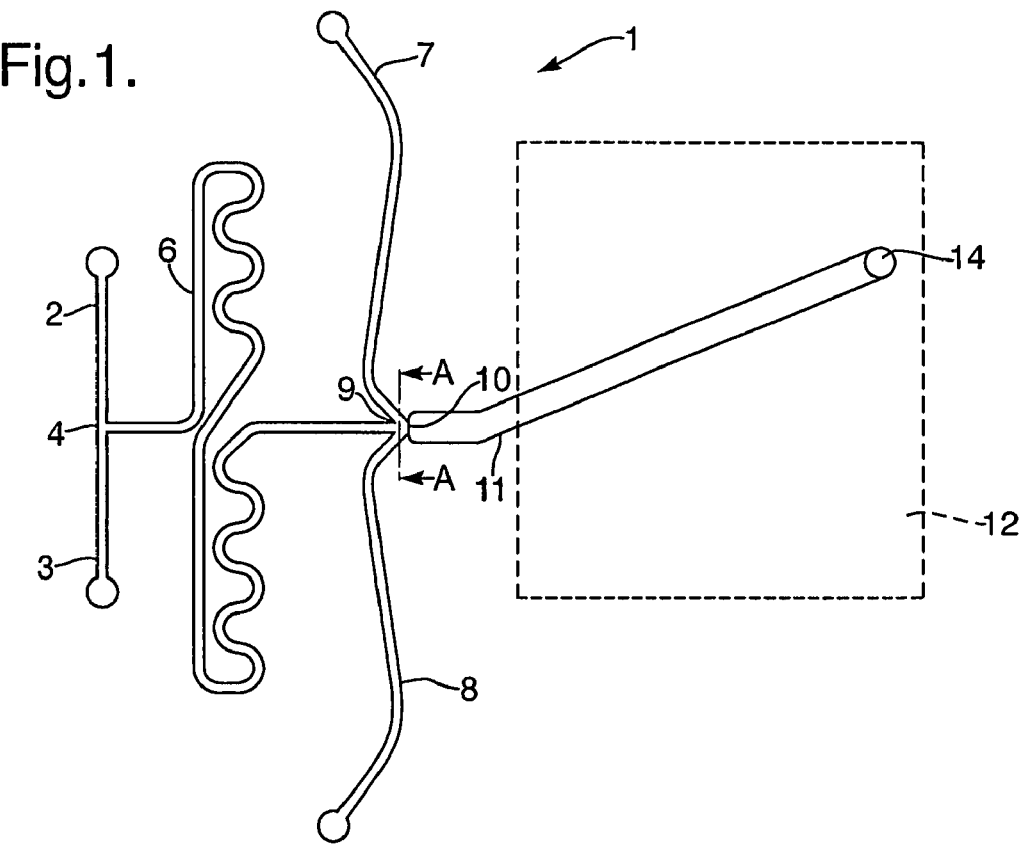
Figure 2A:
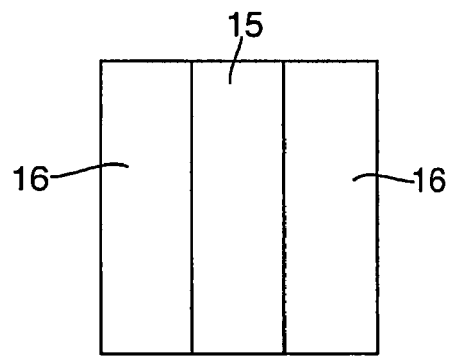
FIG. 2a represents a cross-sectional view of the conduit shown in FIG. 1 along the line A-A.
Figure 2B:
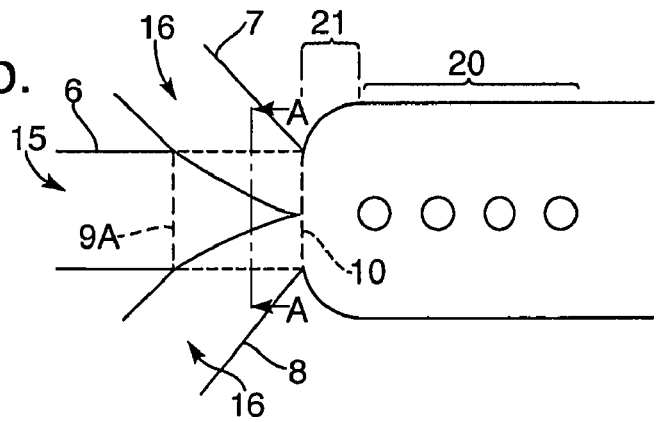
FIG. 2b represents a more detailed view of the junction region of the device of FIG. 1.

Referring to FIGS. 1 and 2b, the device is generally indicated by the numeral 1. A first feeder conduit 2 merges with a second feeder conduit 3 at point 4 to form a functional fluid conduit 6. The functional fluid conduit 6 has a plurality of curves and bends therein to assist in mixing of fluids entering the functional fluid conduit 6 from conduits 2 and 3.

Carrier fluid conduits 7, 8 merge at point 9 to form an encased flow conduit 9a shown by broken lines in FIG. 2b. A discontinuity 10 (in the form of a constricted internal cross sectional area of the conduit) is substantially at the junction where conduits 6, 7 and 8 merge. Carrier fluid conduits 7, 8 and functional fluid conduit 6 have approximately the same cross-sectional area as one another.

The region 20 of the segmented flow conduit 11 downstream of the discontinuity is about twice as wide and twice as deep as each of the carrier fluid conduits, encased flow conduit and the functional fluid conduit. This provides an enlargement in the segmented flow conduit substantially immediately downstream of the discontinuity 10. The region of enlargement is shown by reference numeral 21. The presence of the enlargement promotes formation of spherical segments. The segmented flow conduit 11 extends through irradiation zone 12 and so the contents of the segmented flow conduit 11 exit via outlet 14 after passing through irradiation zone 12.

In use, two miscible fluids enter conduits 2, 3 and merge at point 4. The fluids are mixed in functional fluid conduit 6 as the functional fluid conduit 6 bends; the mixed fluids become the functional fluid. At point 9 (i.e. in encased flow conduit 9a), carrier fluid (which is immiscible with the functional fluid) contained in carrier fluid conduits 7, 8 are permitted to encase functional fluid existing functional fluid conduit 6, to form an encased flow of functional fluid 15 and carrier fluid 16 (see FIGS. 2a and 2b). A cone of functional fluid 15 is encased by carrier fluid 16 in the encased fluid conduit 9a.

The encased flow enters constriction 10 thereby resulting in a vena contracta effect on the encased fluid. As the encased fluid exits the constriction, spherical segments of the functional fluid are produced.

The spherical segments travel through irradiation zone 12 where they are subjected to UV radiation, for example, in order to cure the segments or parts thereof. The cured spherical segments exit the device via outlet 14.

Figure 3A:
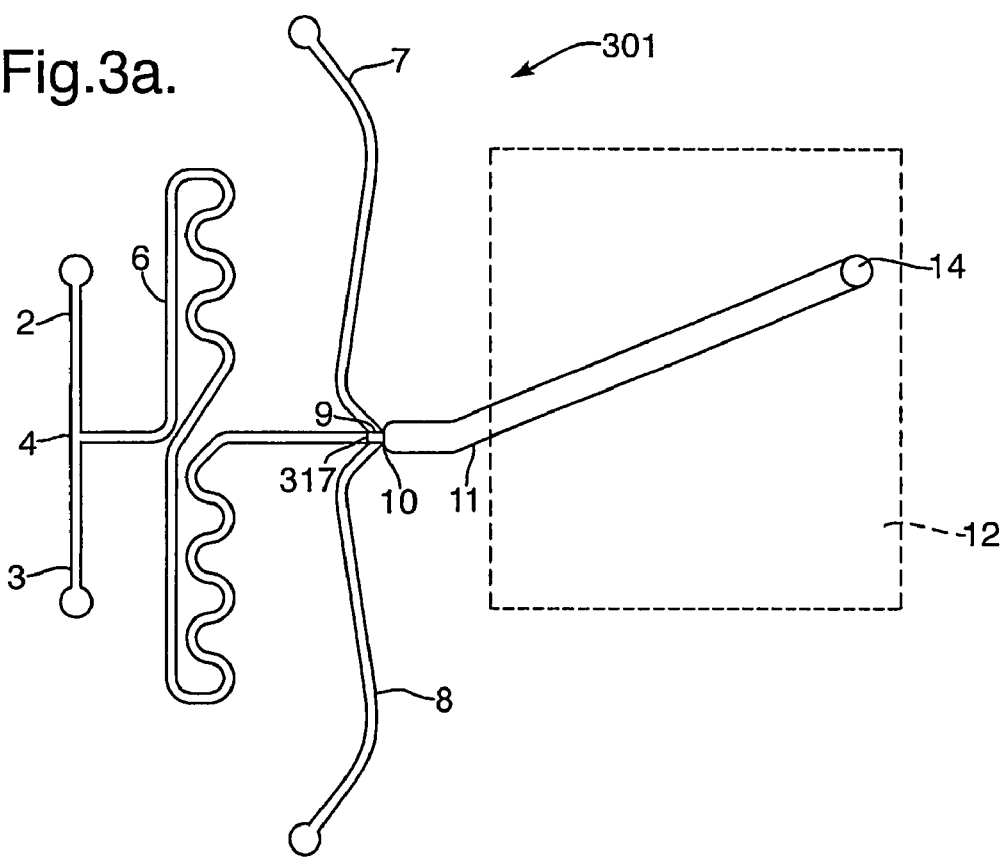
FIG. 3a represents a further device according to the present invention in use.
Figure 3B:
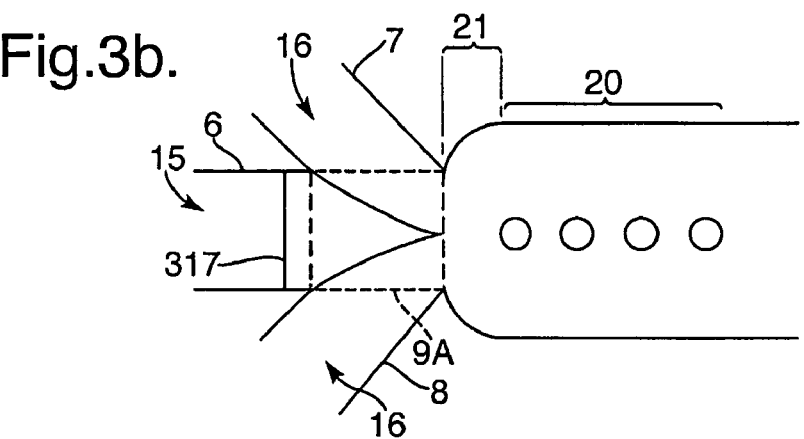

Referring to FIG. 3 where like numerals are used to identify like parts shown in FIG. 1, there is provided a device according to the first aspect of the present invention generally indicated by the numeral 301, however, there is an additional step 317 prior to the irradiation zone 12. As described above with reference to FIG. 1, the region 20 of the segmented flow conduit 11 downstream of the discontinuity is about twice as wide and twice as deep as each of the carrier fluid conduits, the encased flow conduit and the functional fluid conduit. This provides an enlargement in the segmented flow conduit substantially immediately downstream of the discontinuity 10. This promotes formation of spherical segments.

Figure 4:
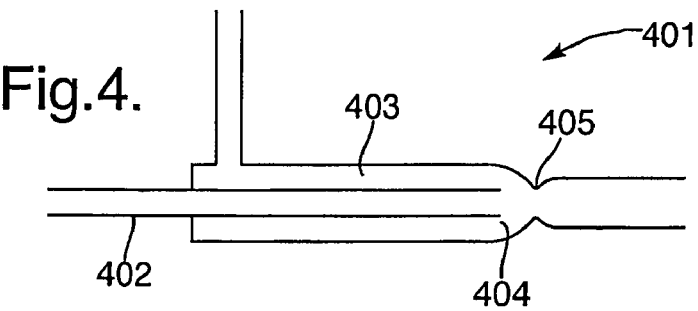
FIG. 4 represents a device according to the second aspect of the present invention.

Referring to FIG. 4, there is provided a device for creating spherical segmented flow generally indicated by the numeral 401, which is typically manufactured from glass. An inner conduit 402 is directed inside outer conduit 403. At point 404 inner conduit terminates in an open end. A constriction 405 is provided in outer conduit 403. The cross-sectional area of the outer conduit 403 after constriction 405 is less than the cross-sectional area of the outer conduit 403 prior to the constriction.

During use, functional fluid flows in inner conduit 402 whilst carrier fluid flows in outer conduit 403. At point 404, where inner conduit 402 terminates, carrier fluid encases functional fluid such that functional fluid does not touch the inner surface of outer conduit 403. As the encased fluid passes through constriction 404 spherical segments are created.

Figure 5A:
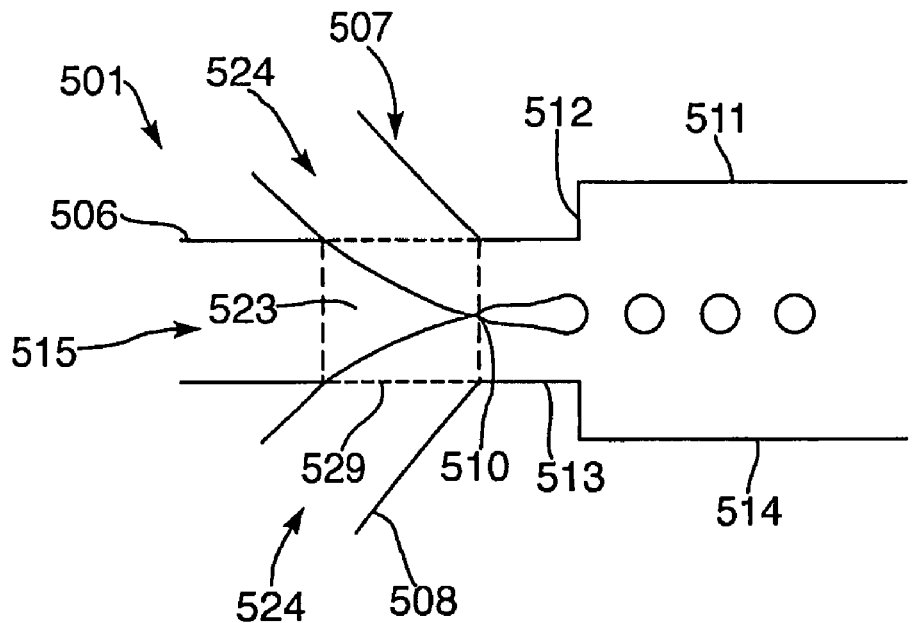
FIG. 5a represents a plan view of the junction region of a further device according to the first and third aspects of the present invention.
Figure 5B:
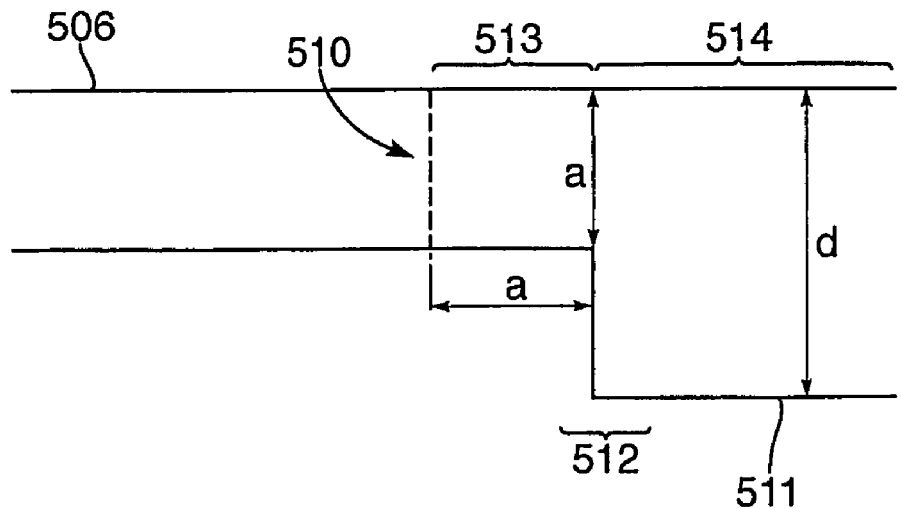

FIGS. 5a and 5b show the region around the junction of a device (generally shown by reference numeral 501) in use. The device 501 comprises a functional fluid conduit 506 carrying a functional fluid 515. The functional fluid conduit 506 merges with two carrier fluid conduits 507, 508, each carrying carrier fluid 524, to form an encased flow conduit 529 shown by broken lines in FIG. 5a. In the encased flow conduit 529 the functional fluid 515 is encased by carrier fluid 524 to form a substantially conical shape 523. The encased flow conduit 529 is provided with a constriction 510. Although the width of the encased flow conduit at the constriction is the same width as each of the functional fluid conduit and carrier conduits, there is effectively a flow constriction; the three "volumes" flowing through the functional fluid conduit and two carrier conduits have to try to pass through the one "volume" of the encased flow conduit. The constriction causes the formation of spherical segments downstream of the constriction.

Downstream of the constriction 510 is segmented flow conduit 511. The portion 513 of segmented flow conduit 511 immediately downstream of the constriction 510 is essentially the same cross-sectional shape and size as each of the carrier fluid conduits, encased flow conduit and functional fluid conduits, having a square cross-section, and a width "a" and a depth "a". At a distance of about "a" downstream of the constriction 510, there is an enlargement (shown as reference numeral 512) in the cross-sectional area of segmented flow conduit 511. The portion 514 of the segmented flow conduit 511 downstream of the enlargement is essentially square in cross-section and has a depth and width of "d" that is about twice that of the portion 513 of segmented flow conduit 511 upstream of the enlargement 512. Segmented flow conduit 511 is therefore provided with an enlargement 512 in cross-section. The distance between the discontinuity 510 and the enlargement 512 is about "a", the depth of the segmented flow conduit 511 upstream of the enlargement. The presence of the enlargement 512 close to the discontinuity has been found to promote the formation of spherical segments and improves the size uniformity of spherical segments compared to a device that does not have such an enlargement.

All of the conduits in the devices of FIGS. 1, 2, 4 and 5 were manufactured by machining conduits from a low surface energy polymer, in this case polytetrafluoroethlyene. Pumps are typically used to cause the various fluids to flow through the device.

EXAMPLE 1

The device of FIG. 5 was used to manufacture polymerised polyvinyl alcohol hydrogel spheres. The carrier fluid conduits 507, 508 and functional fluid conduit 506 are square in section, having a depth and width of 500 microns. The portion 513 of the segmented flow conduit 511 immediately downstream of the constriction 510 is also square in section and has a depth and width of 500 microns. The portion 514 of the segmented flow conduit 511 immediately downstream of the enlargement 512 is square in section and has a depth and width of 1000 microns. The enlargement 512 is about 500 microns downstream of the constriction 510. The carrier fluid 524 was sunflower oil flowing at 0.9 ml/min and the functional fluid 515 comprised a polyvinyl alcohol macromer (Mowial 4-98, Kuraray Specialties Europe, Germany), the functional fluid flowing at 0.06 ml/min. segmented spheres were produced which were subsequently exposed to radiation to produce cross-linked polyvinyl hydrogel spheres dispersed in sunflower oil. The spheres on exposure to UV radiation, had a mean diameter of 600±17 microns.

EXAMPLE 2

The device used for Example 2 was as described with reference to Example 1. The carrier fluid 514 was sunflower oil flowing at 0.17 ml/min and the functional fluid 515 was molten agarose flowing at 0.033 ml/min through the functional fluid conduit 506. Segmented spheres were produced (dispersed in sunflower oil), the spheres subsequently being cooled to produce solid agarose hydrogel spheres having a mean diameter of 663 microns, with a standard deviation of 20 microns.

In certain circumstances, it may be beneficial to locate the enlargement a short distance from the discontinuity (as in FIG. 5), as opposed to locating the enlargement substantially at or immediately downstream of the discontinuity (as in FIGS. 1 and 3a). Such a separation of the discontinuity and enlargement has been found, in certain circumstances, to improve the uniformity of the size of the spheres and may also lead to the formation of bigger spheres (if required).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional.

The invention claimed is:

1. A device for producing a spherical segmented flow of fluid, which device includes: a functional fluid conduit arranged to contain a functional fluid;
   at least two carrier fluid conduits, each carrier fluid conduit arranged to carry a carrier fluid, the functional fluid conduit merging with the carrier fluid conduits at a junction to form an encased flow conduit thereby permitting functional fluid to be sandwiched (or encased) by the carrier fluid to form an encased flow, the encased flow conduit having a discontinuity therein such that the encased flow forms into a flow of alternate segmented spheres after the discontinuity, wherein the device is provided with a segmented flow conduit downstream of the encased flow conduit, the segmented flow conduit being provided with an enlargement in cross-section and a step coincident with the enlargement in cross-section the depth of the segmented flow conduit immediately downstream of the step being defined as 2a, and the step being provided at a distance of up to 5a downstream of the discontinuity.

2. A device according to claim 1 wherein the enlargement in cross-section is substantially at or immediately downstream of the discontinuity.

3. A device according to claim 1 wherein the enlargement is sufficiently close to the discontinuity so as to encourage the formation of spherical segments.

4. A device according to claim 1 wherein the discontinuity is in the form of a constriction.

5. A device according to claim 1 wherein the encased flow conduit and the segmented flow conduit are provided by a unitary conduit.

6. A device according to claim 1, wherein if the depth of the encased flow conduit or segmented flow conduit immediately downstream of the enlargement is, 2 a, then the enlargement is provided a distance of from 0.5 a to 1.5 a downstream of the discontinuity.

7. A device according to claim 1 wherein if the cross-sectional area of the encased flow conduit or segmented flow conduit immediately downstream of the enlargement is 4 a$^2$, then the enlargement is provided a distance of from 0.5 a to 1.5 a downstream of the discontinuity.

8. A device according to claim 1 wherein if the width of the encased flow conduit or segmented flow conduit immediately downstream of the enlargement is 2 a, then the enlargement is provided a distance of from 0.5 a to 1.5 a downstream of the discontinuity.

9. A device according to claim 1 wherein the cross-sectional area of the encased flow conduit or segmented flow conduit immediately downstream of the enlargement is from 3.5 to 4.5 times larger than the cross-sectional area of the encased flow conduit or segmented flow conduit immediately upstream of the enlargement.

10. A device according to claim 1 wherein two or more feeder conduits merge to form the functional fluid conduit.

11. A device according to claim 1 wherein the functional fluid conduit is shaped and dimensioned to permit mixing of fluid contained therein.

12. A device according to claim 1 comprising a segmented flow conduit wherein a portion of the segmented flow conduit provides an irradiation zone, the device further comprising an external radiation source arranged, in use, to illuminate the irradiation zone.

13. A microfluidic device, having
a functional conduit for carrying a functional fluid, first and second lateral carrier fluid conduits confluent with the functional conduit at a junction region, for carrying a carrier fluid,
wherein the device is provided with a further conduit extending from the junction region,
the device being provided with a constriction or another discontinuity for producing a flow of spherical segments of functional fluid dispersed in the carrier fluid, the constriction or other discontinuity being located substantially at or downstream of the junction,
the further conduit being provided with an enlargement in cross-section substantially at or downstream of the constriction or other discontinuity and a step coincident with the enlargement in cross-section, the depth of the further conduit immediately downstream of the step being defined as 2 a, and the step being provided at a distance of up to 5 a downstream of the discontinuity.

14. A device according to claim 13 wherein the encased flow conduit is provided with an enlargement in cross-section substantially at or immediately downstream of the constriction or other discontinuity.

15. A device according to claim 13 wherein the enlargement in cross-section is sufficiently close to the constriction or other discontinuity so as to encourage formation of spherical segments.

16. A method of producing a spherical segmented flow of a fluid, which method includes:
introducing a functional fluid into a functional fluid conduit and a carrier fluid into a carrier fluid conduit;
permitting the carrier fluid to contact the functional fluid such that the carrier fluid encases or sandwiches the functional fluid;
providing a discontinuity in the flow of the sandwiched or encased flow such that as the encased flow passes the discontinuity, a vena contracta effect is achieved thereby forcing the encased flow to form into spherical segments,
the method further comprising providing an enlargement in cross-section in a conduit substantially at or immediately downstream of the discontinuity, or sufficiently close to the discontinuity so as to encourage the formation of spherical segments, and a step coincident with the enlargement in cross-section the depth of the further conduit immediately downstream of the step being defined as 2 a, and the step being provided at a distance of up to 5 a downstream of the discontinuity.

17. A device according to claim 1, wherein the step is provided a distance of from 0.5 a to 3 a downstream of the discontinuity.

18. A device according to claim 1 wherein the step is provided a distance from 0.5 a to 1.5 a downstream of the discontinuity.

* * * * *